US012093713B2

(12) United States Patent
Gopalan et al.

(10) Patent No.: US 12,093,713 B2
(45) Date of Patent: Sep. 17, 2024

(54) SYSTEMS AND METHODS FOR LIVE UPDATE OF OPERATING SYSTEMS AND HYPERVISORS WITHIN VIRTUALIZATION SYSTEMS

(71) Applicant: Research Foundation for the State University of New York, Binghamton, NY (US)

(72) Inventors: Kartik Gopalan, Vestal, NY (US); Hui Lu, Binghamton, NY (US)

(73) Assignee: Research Foundation for the State University of New York, Binghamton, NY (US)

( * ) Notice: Subject to any disclaimer, the term of this patent is extended or adjusted under 35 U.S.C. 154(b) by 680 days.

(21) Appl. No.: 17/229,996

(22) Filed: Apr. 14, 2021

(65) Prior Publication Data
US 2021/0318900 A1     Oct. 14, 2021

Related U.S. Application Data

(60) Provisional application No. 63/009,771, filed on Apr. 14, 2020.

(51) Int. Cl.
G06F 9/455    (2018.01)

(52) U.S. Cl.
CPC ............ *G06F 9/45558* (2013.01); *G06F 2009/45583* (2013.01)

(58) Field of Classification Search
CPC ....... G06F 9/45558; G06F 2009/45583; G06F 2009/4557
See application file for complete search history.

(56) References Cited

U.S. PATENT DOCUMENTS

2010/0217916 A1\* 8/2010 Gao ............... G06F 12/109
                                                                      718/1
2012/0254865 A1\* 10/2012 Saeki ............ G06F 8/656
                                                                      718/1

(Continued)

OTHER PUBLICATIONS

Hardik Bagdi, Rohith Kugve, and Kartik Gopalan. 2017. HyperFresh: Live Refresh of Hypervisors Using Nested Virtualization. In Proceedings of the 8th Asia-Pacific Workshop on Systems (APSys '17). Association for Computing Machinery, New York, NY, USA, Article 18, 1-8. (Year: 2017).\*

*Primary Examiner* — Jorge A Chu Joy-Davila
(74) *Attorney, Agent, or Firm* — Lance D. Reich; Peter Fallon

(57) ABSTRACT

Systems and methods for live updating virtualization systems are disclosed. One method may include identifying a container on a first virtual machine of a virtualization system. The container may include at least one process associated with performing a task on a first virtual machine. The method may also include determining a first communication path between the process included in the container on the first virtual machine and a hypervisor of the virtualization system, and migrating the container and the process included in the container to a second virtual machine. The second virtual machine may be distinct from the first virtual machine. Additionally, the method may include determining a second communication path between the process included in the migrated container on the second virtual machine and the hypervisor of the virtualization system.

20 Claims, 7 Drawing Sheets

(56) References Cited

U.S. PATENT DOCUMENTS

| | | | | |
|---|---|---|---|---|
| 2014/0101657 A1* | 4/2014 | Bacher | ............... | G06F 9/45558 |
| | | | | 718/1 |
| 2016/0378688 A1* | 12/2016 | Rozas | .................... | G06F 21/53 |
| | | | | 713/190 |
| 2018/0121189 A1* | 5/2018 | Philippov | ................. | G06F 8/65 |
| 2019/0361728 A1* | 11/2019 | Kumar | ............... | G06F 9/45558 |
| 2020/0097323 A1* | 3/2020 | Nider | .................... | G06F 3/067 |

\* cited by examiner

SYSTEMS AND METHODS FOR LIVE UPDATE OF OPERATING SYSTEMS AND HYPERVISORS WITHIN VIRTUALIZATION SYSTEMS

CROSS-REFERENCE TO RELATED APPLICATIONS

This application claims priority to U.S. provisional application No. 63/009,771 filed on Apr. 14, 2020, the content of which is hereby incorporated by reference into the present application

GOVERNMENT RIGHTS

This invention was made with government support under Award Number 1527338, awarded by the National Science Foundation—Division of Computer and Network Systems. The government has certain rights in the invention.

BACKGROUND

The disclosure relates generally to virtualization systems, and more particularly, to systems and methods for live update of operating systems and/or hypervisors within virtualization systems.

Virtualization-based server consolidation is a common practice in today's cloud data centers. Hypervisors host multiple virtual machines (VMs), or guests, on a single physical host to improve resource utilization and achieve agility in resource provisioning for cloud applications. Hypervisors must be often updated or replaced for various purposes, such as for applying security/bug fixes adding new features, or simply for software rejuvenation to reset the effects of any unknown memory leaks or other latent bugs.

Updating a hypervisor usually requires a system reboot, especially in the cases of system failures and software aging. Live patching can be used to perform some of these updates without rebooting, but it relies greatly on the old hypervisor being patched, which can be buggy and unstable. To eliminate the need for a system reboot and mitigate service disruption, another approach is to live migrate the VMs from the current host to another host that runs a clean and updated hypervisor. Though widely used, live migrating tens or hundreds of VMs from one physical host to another, i.e. inter-host live migration, can lead to significant service disruption, long total migration time, and large migration-triggered network traffic, which can also affect other unrelated VMs.

As an alternative to virtual machine (VM) based virtualization (e.g., KVM, VMware, Xen), containers relying on process-based virtualization offer a much more flexible way of deploying and executing applications. With containers, a variety of new use cases have been enabled in clouds such as (micro-)services orchestration, management and just-in-time deployment. For better isolation and security in multi-tenant public clouds, containers are commonly encapsulated in VMs while running.

Like VMs, in-cloud containers need the capability to migrate from one VM to another to achieve agility goals like balancing load, escaping from hardware failures, scaling in/out demands for resources, etc. A "cold" container migration procedure usually involves three main steps: (1) suspending the container on the source VM; (2) copying the state of the container from the source VM to the destination VM; and (3) restoring the container on the destination VM with the same state as that on the source VM. In practice, a live container migration is more appealing which keeps the container running during migration—without disrupting the services of applications running within. For example, pre-copy-based live container migration allows the migrated container to keep running on the source side while its memory gets transferred to the destination in an iterative manner (i.e., only the dirtied memory is transferred in each iteration), until the dirtied portion is small enough when the container is paused and its remaining state is copied (less migration downtime).

Though the above approaches reduce the migration downtime, they in turn lengthen the total migration time (i.e., the time between the start and the end of the migration) due to either iterative memory copying or on-demand memory pages fetching. During the total migration time, the performance of applications running in containers could be negatively impacted, for example, by costly page-fault-based dirty memory tracking or massive migration network traffic.

BRIEF DESCRIPTION

A first aspect of the disclosure provides a method for migrating a container in a virtualization system. The method includes: identifying the container on a first virtual machine of the virtualization system, the container including a process associated with performing a task on first virtual machine; determining a first communication path between the process included in the container on the first virtual machine and a hypervisor of the virtualization system; migrating the container and the process included in the container to a second virtual machine, the second virtual machine distinct form the first virtual machine; and determining a second communication path between the process included in the migrated container on the second virtual machine and the hypervisor of the virtualization system.

A second aspect of the disclosure provides a method for replacing hypervisors in a virtualization system. The method includes: identifying a process associated with performing a task on a virtual machine of the virtualization system; determining a first communication path between the process included on the virtual machine and a hyperplexor of the virtualization system via a first hypervisor, the first hypervisor communicatively connected to the virtual machine and the hyperplexor; replacing the first hypervisor of the virtualization system with a second hypervisor, the second hypervisor communicatively connected to the virtual machine and the hyperplexor; and determining a second communication path between the process included on the virtual machine and the hyperplexor of the virtualization system via the second hypervisor.

A third aspect of the disclosure provides a method for replacing operating systems (OS) in a virtualization system. The method includes: identifying: a container on a first virtual machine of the virtualization system, the container including a process associated with performing a task on first virtual machine, and a first operating system (OS) included on the first virtual machine; determining a first communication path between the process included in the container on the first virtual machine and a hypervisor of the virtualization system; migrating the container and the process included in the container to a second virtual machine, the second virtual machine distinct form the first virtual machine, and wherein the second virtual machine includes a second operating system (OS) distinct from the first OS on the first virtual machine; and determining a second communication path between the process included in the migrated container on the second virtual machine and the hypervisor of the virtualization system.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current disclosure it will become necessary to select certain terminology when referring to and describing relevant components within the disclosure. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

As discussed herein, the disclosure relates generally to virtualization systems, and more particularly, to systems and methods for live update of operating systems and/or hypervisors within virtualization systems.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
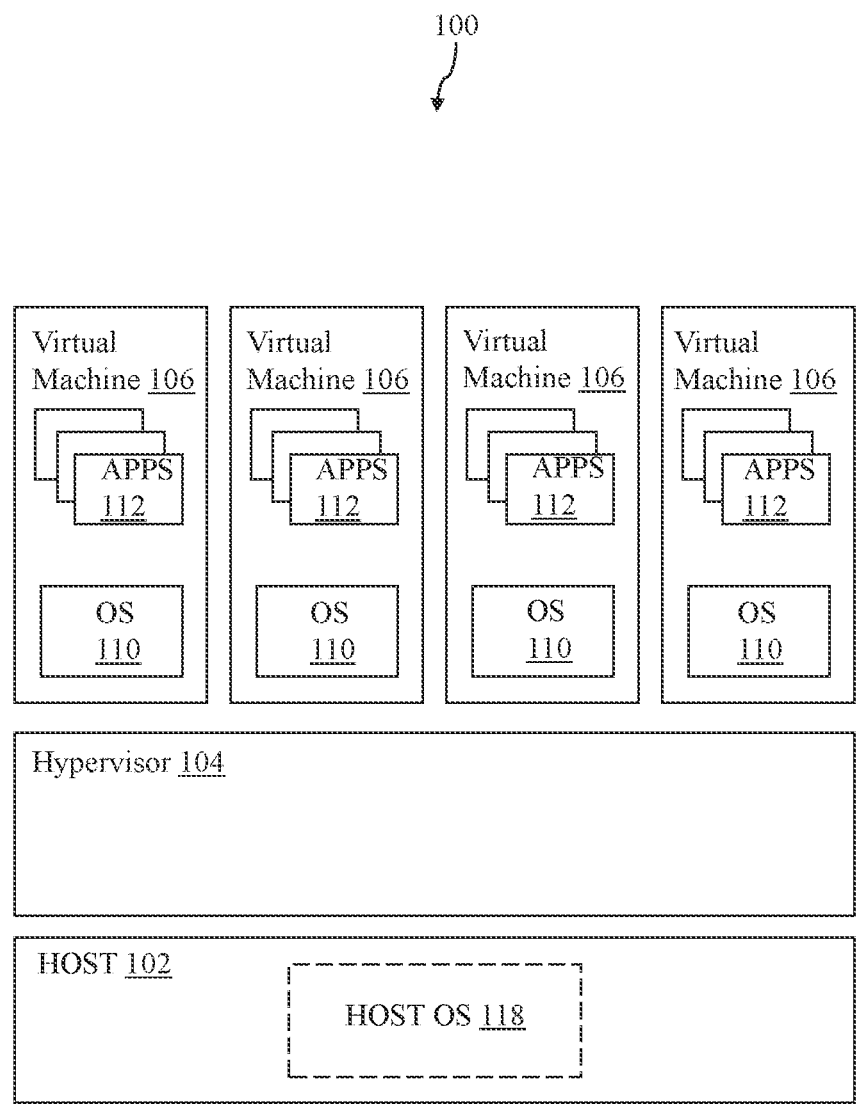
FIG. 1 shows a schematic view of a virtualization system which includes a plurality of virtual machines according to embodiments of the disclosure.

FIG. 1 shows a schematic view of a virtualization system 100. As discussed herein, virtualization system 100 may refer to a collection or group of software-hardware components that provide "virtual hardware" or "virtual operating systems" on a user's computing device (e.g., laptop) to gain access to a shared computing system, server, and/or infrastructure. In the non-limiting embodiment shown in FIG. 1, virtualization system 100 may include a host 102. Host 102 may represent a hardware/computing device or system configured to aid in the operation of virtualization system 100, and more specifically the virtual machines included within virtualization system 100.

Virtualization system 100 may also include a hypervisor 104. In non-limiting examples, hypervisor 104 may include, for example, a software stored within, executed by, and/or in operably connected/in communication with host 102. Hypervisor 104 may be positioned between, with respect to the communication link or path, virtual machines 106 and host 102. As such, hypervisor 104 may control, engage, manage, and/or maintain operation of virtual machines 106 of virtualization system 100, as discussed herein.

In the non-limiting example, virtual machines 106 may be in communication with host 102 via hypervisor 104. More specifically, hypervisor 104 may generate, create, and/or ensure operation of each of the plurality of virtual machines 106 included within virtualization system 100. Additionally, and as discussed herein, hypervisor 104 may act or operate as a communication bridge between virtual machines 106 and host 102.

Each of the plurality of virtual machines 106 included within virtualization system 100 may allow a user access to host 102. For example, a user or guest of virtualization system 100 may access host 102 using virtual machine 106. More specifically, virtual machine 106 may operate and/or function on a user's guest machine, allowing user access to host 102 via virtual machine 106 and hypervisor 104, respectively. Each virtual machine 106 may include various features and/or components. As shown in FIG. 1, each virtual machine may include an operating system (OS) 110 included therein. OS 110 may include any suitable operating system for controlling the operations and/or functions of virtual machines.

Each of the plurality of virtual machines 106 may also include a plurality of applications (APPS) 112. APPS 112 may refer to any suitable software or program used for executing a task or an operation in virtual machine 106. As discussed herein, APPS 112, and more specifically the tasks of APPS 112, may be accomplished through processes pre-formed on virtual machine 106.

In a non-limiting example, hypervisor 104 may be formed as a Type 1 hypervisor. Type 1 hypervisor may be hosted and/or engaged directly within hardware and/or system forming host 102. In another non-limiting example, hypervisor 104 may be formed as a type 2 hypervisor. Distinct from Type 1, Type 2 hypervisor may be hosted on and/or in conjunction with a host operating system (host OS) 118 included within host 102 of virtualization system 100.

Figure 2:
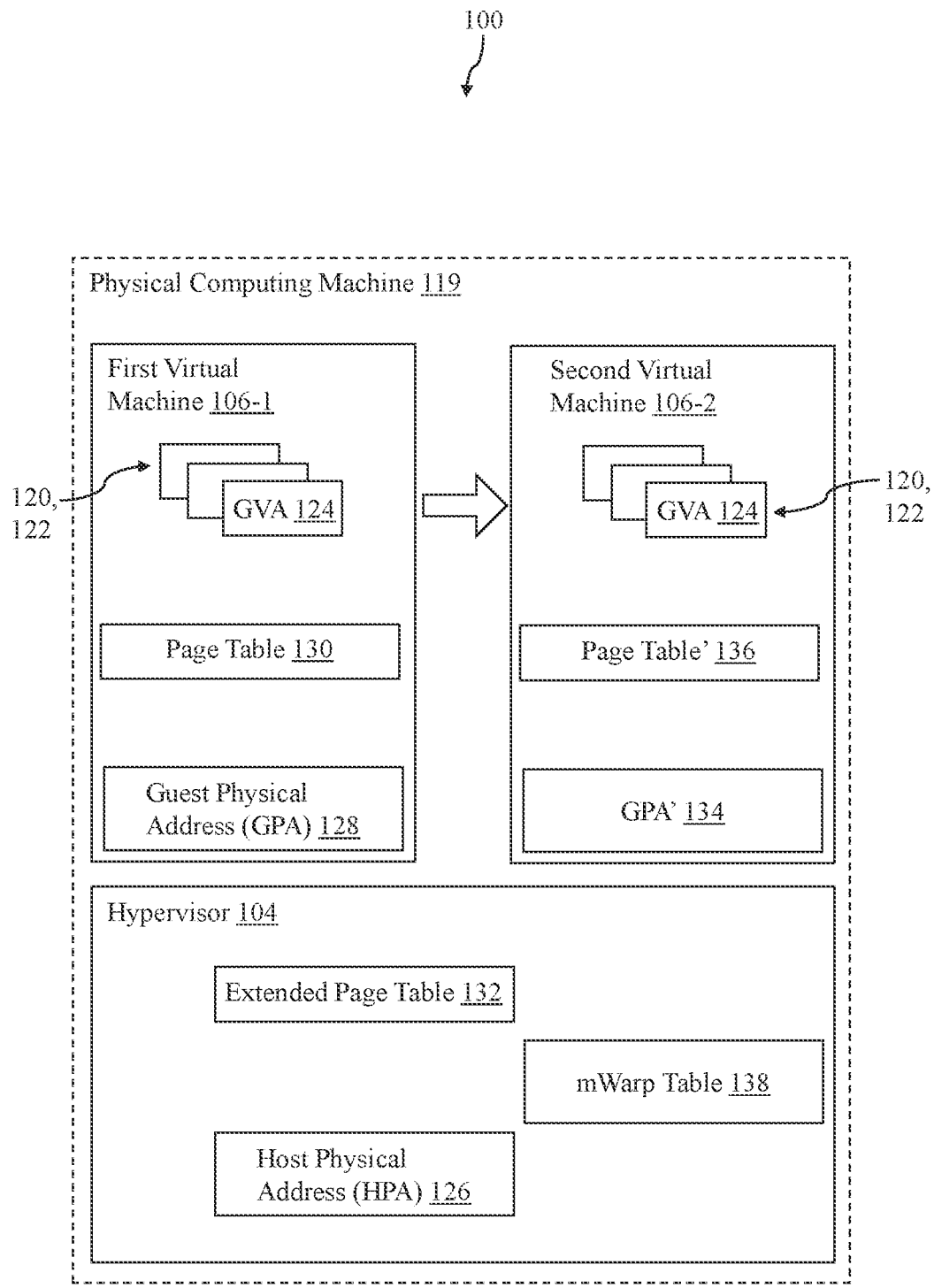
FIG. 2 shows a schematic view of a portion of the virtualization system of FIG. 1 including container migration between virtual machines, according to embodiments of the disclosure.

Turning to FIG. 2, a portion of virtualization system 100 of FIG. 1 is shown. Specifically, FIG. 2 shows a schematic view of a portion of virtualization system 100 that undergoes a live migration process. In the non-limiting example, and as discussed herein, FIG. 2 depicts the live migration of containers 120 found in virtual machines 106.

Containers 120 may be found or included within virtual machines 106 within virtualization system 100. For example, a first virtual machine 106-1 may include a plurality of containers 120 included therein. Each of the plurality of containers 120 may refer to a collection and/or predefined grouping of features included within virtual machine 106 including, but not limited to, APPS 112 (see, FIG. 1). Associated with containers 120 and/or the features included therein may include at least one or a plurality of processes 122. That is, each container of the plurality of the containers 120 included within first virtual machine 106-1 may include a plurality of associated processes 122 that may correspond to the execution, operation, and/or accomplishment of tasks performed by or associated with container 120 and the features (e.g., APPs 112) included therein.

The execution of processes 122 may require communication between first virtual machine 106-1 and host 102 (see, FIG. 1) via hypervisor 104. More specifically, each process 122 associated with containers 120 may rely on the obtaining, transmitting, and/or linking of data and/or information included within virtual machine 106-1, hypervisor 104, and host 102 to ensure that processes 122 are configured and/or capable of being carried out on first virtual machine 106-1. For example, and with reference to FIG. 2, a mapping, linking, and/or executed communication between a guest virtual address (GVA) 124 associated with a specific process 122, and host physical address (HPA) 126 associated with the same process 122 must occur to perform process 122 on first virtual machine 106-1. However, in order to achieve this desired effect, multiple portions of data must be linked, mapped, communicated, obtained, and/or verified. In the non-limiting example, GVA 124 for process 122 may be associated with and/or mapped to a guest physical address (GPA) 128. Mapping between GVA 124 and GPA 128 within first virtual machine 106-1 may be achieved using page table 130, also included within first virtual machine 106-1. Page table 130 of first virtual machine 106-1 may be specific to first virtual machine 106-1, and/or may store and/or include all mappings between GVA 124 for various processes 122 and GPA 128. That is, GPA 128 for processes 122 may be specific to first virtual machine 106-1. As such, page table 130 included within first virtual machine 106-1 may be specific to and/or only applicable in mapping GVA 124 associated with process 122 to GPA 128 in first virtual machine 106-1.

Additionally, once GVA 124 to GPA 128 is mapped for process 122, hypervisor 104 of virtualization system 100 may perform additional mapping or linking relating to process 122. For example, hypervisor 104 may utilize extended page table 132 included therein to map GPA 128 to HPA 126 for first virtual machine 106-1. Similar to page table 130, extended page table 132 included in hypervisor 104 may associate, link, or map GPA 128 for process 122 performed in first virtual machine 106-1 to HPA 126 included in hypervisor 104. Typically, to associate or map each GPA in distinct virtual machines to specific HPA, hypervisor 104 would require at least one extended page table 132 therein that is associated with each virtual machine. For example, in order to map GPA for a second virtual machine (e.g., second virtual machine 106-2) to HPA124, hypervisor 104 would include a second extended page (not shown) that is distinct from extended page table 132.

With continued reference to FIG. 2, a process for live migration of containers 120 from first virtual machine 106-1 to second virtual machine 106-2 is discussed below. In a non-limiting example shown in FIG. 2, and as discussed herein, the live migration of containers 120 from first virtual machine 106-1 to second virtual machine 106-2 may take place or occur on the same or a single physical computing machine 119 (shown in phantom) that may run, operate, and/or engage virtualization system 100, and more specifically first virtual machine 106-1 to second virtual machine 106-2, respectively. That is, first virtual machine 106-1 to second virtual machine 106-2 may be co-located, run on, and/or be operable within a single physical computing machine 119. Physical computing machine 119 may include any suitable device, machine, and/or system that a user may engage to interact with virtualization system 100. For example, physical computing machine 119 may include, but is not limited to, a desktop computer, a laptop computer, a table, a portable communication device (e.g., smart phone), and the like. In another non-limiting example, first virtual machine 106-1 to second virtual machine 106-2 may be located and/or operational on distinct physical computing machines and/or servers that may be both connected and in communication with host 102 (see, FIG. 1).

In the non-limiting example, only containers 120 may be migrated from first virtual machine 106-1 to second virtual machine 106-2. More specifically, containers 120, associated processes 122, and GVA 124 associated with specific processes 122 may be migrated or moved from first virtual machine 106-1 to second virtual machine 106-2 in the live migration process. In order for containers 120 and/or processes 122 to be operational and/or function on second virtual machine 106-2, mappings between GVA 124 for second virtual machine 106-2 and HPA 126 of hypervisor 104 may be required as similarly discussed herein with respect to first virtual machine 106-1. That is, GVA 124 for process 122 may be associated with and/or mapped to GPA' 134 of second virtual machine 106-2. Mapping between GVA 124 and GPA' 134 within second virtual machine 106-2 may be achieved using page table' 136, also included within second virtual machine 106-2. GPA' 134 and page table' 136 may be specific to second virtual machine 106-2, and/or may store and/or include all mappings between GVA 124 for various processes 122 and GPA' 134. As a result, data found in and/or associated with GPA' 134 and page table' 136 in second virtual machine 106-2 may be distinct from data found in and/or associated with GPA 128 and page table 130 in first virtual machine 106-1.

Additionally, once GVA 124 to GPA' 134 is mapped for migrated process 122, hypervisor 104 of virtualization system 100 may perform additional mapping or linking relating to process 122. In conventional systems, hypervisor 104 may utilize a second or distinct extended page table, that may be linked or associated with second virtual machine 106-2, to map GPA' 134 to HPA 126 after containers 120 are migrated. However, in the non-limiting example shown in FIG. 2, hypervisor 104 may again utilize extended page table 132, as well as an mWarp table 138 to map GPA' 134 to HPA 126 for second virtual machine 106-2. The mWarp table 138 included in hypervisor 104 may include or store data relating to all GVA 124 to HPA 126 mappings for process 122 for each virtual machine 106 included within virtualization system 100. Each mapping data included or stored within mWarp table 138 for each process 122 may be identified, associated with, and/or specific to each virtual machine 106. The mWarp table 138 may include or determine each of these mappings specific to the process 122 within distinct virtual machines 106 by comparing and/or analyzing each of the GVA to GPA mappings for process 122 in each virtual machine 106-1, 106-2, in view of extended page table 132 included in hypervisor 104. For example, mWarp table 138 may include a mapping for GVA 124 on first virtual machine 106-1 that includes: GVA 124→GPA 128→HPA 126. Additionally, mWarp table 138 may include another mapping for GVA 124 on second virtual machine 106-1 that includes: GVA 124→GPA' 134→HPA 126. As such, and in the non-limiting example, live migration of only container 120 may be achieved from first virtual machine 106-1 to second virtual machine 106-2 without the requirement of a plurality of extended page tables within hypervisor 104. Rather, mWarp tables 138 may add in mapping containers 120, and specifically GVA 124 for process 122 for container 120, to HPA 126 once migrated. Additionally, the live migration of only containers 120, as well as the use of mWarp tables 138 may also achieve migration in reduced time (e.g., less than 10-ms), and/or may not interrupt or disrupt the interaction a user may have with virtualization system 100 when performing the live migration process. That is, containers 120 may be migrated from first virtual machine 106-1 to second virtual machine 106-2 without disrupting the user's experience (e.g., shutting apps, access down) with virtualization system 100.

Figure 3:
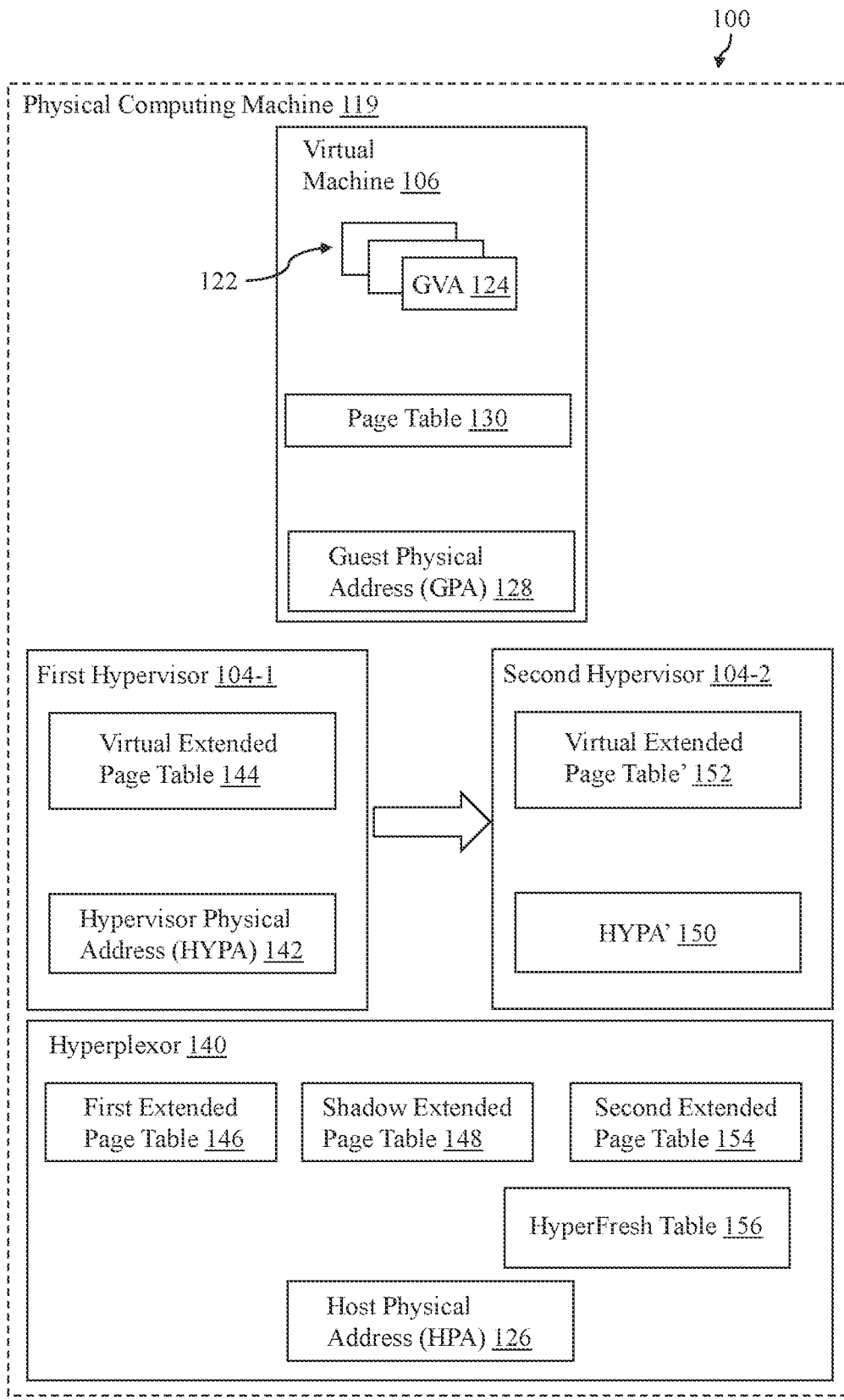
FIG. 3 shows a schematic view of a portion of the virtualization system of FIG. 1 including hypervisor replacement within a single physical machine, according to embodiments of the disclosure.
Figure 4:
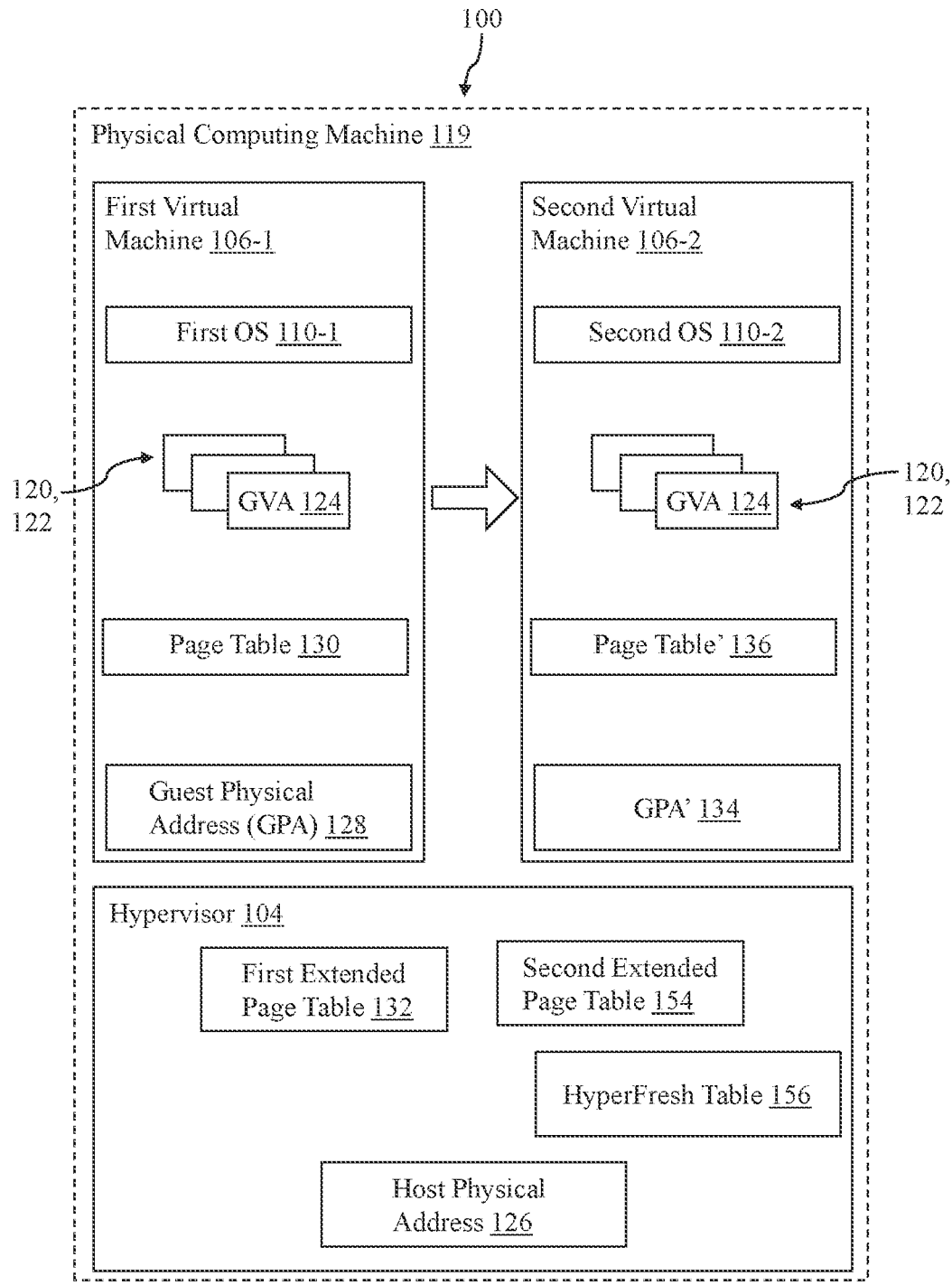
FIG. 4 shows a schematic view of a portion of the virtualization system of FIG. 1 including operating system (OS) being replaced on virtual machines, according to embodiments of the disclosure.

The process or method of live migration discussed herein with respect to FIG. 2 may be performed on other portions or aspects of virtualization system 100 as well. For example, and as discussed herein in further detail, FIG. 3 shows a non-limiting example of performing a replacement of a hypervisor on a single virtual machine 106 of virtualization system 100, and FIG. 4 shows a non-limiting example of performing a replacement of an operating system OS within virtualization system 100. It is understood that similarly named components and/or similarly numbered components may function in a substantially similar fashion, may include similar materials/components, and/or may include similar interactions with other components. Redundant explanation of these components has been omitted for clarity.

Turning to FIG. 3, the process or method of replacing a first hypervisor 104-1 with a second hypervisor 104-2 is shown. In the non-limiting example first hypervisor 104-1 may be replaced by second hypervisor 104-2 on a single, virtual machine 106 of virtualization system 100. Additionally in the non-limiting example shown in FIG. 3, and similar to FIG. 2, the replacement of first hypervisor 104-1 with second hypervisor 104-2 may take place or occur on the same or single physical computing machine 119 (shown in phantom) that may run, operate, and/or engage virtualization system 100, and more specifically single virtual machine 106.

Process 122 may be associated with the execution and/or request to perform a task associated with an APP 112 (see, FIG. 1) included within virtual machine 106. Similar to FIG. 2, the execution of process 122 may require communication between virtual machine 106 and host 102 (see, FIG. 1) via hypervisor 104. More specifically, each process 122 may rely on the obtaining, transmitting, mapping, and/or linking of data and/or information included within virtual machine 106, hypervisor 104, and host 102 to ensure that process 122 are configured and/or capable of being carried out virtual machine 106. However, in the process of replacing a first or current hypervisor 104-1 with a second or new hypervisor 104-2, the use of a shim layer, for example a hyperplexor layer 140 may be required within virtualization system 100.

With reference to FIG. 3, a mapping, linking, and/or executed communication between a guest virtual address (GVA) 124 associated with a specific process 122, and host physical address (HPA) 126 associated with the same process 122 must occur to perform process 122 on virtual machine 106 using first hypervisor 104-1. As similarly discussed herein with respect to first virtual machine 106-1 shown in FIG. 2, mapping between GVA 124 and GPA 128 within virtual machine 106 shown in FIG. 3 may be achieved using page table 130, also included within virtual machine 106. GPA 128 for process 122 may then be mapped to a hypervisor physical address (HYPA) 142 included in first (or current) hypervisor 104-1. Similar to GPA 128, mapping between GPA 128 and HYPA 142 within first hypervisor 104-1 may be achieved using virtual extended page table 144, also included within first hypervisor 104-1. Virtual extended page table 144 may be specific to first hypervisor 104-1, and/or may store and/or include all mappings between GPA 128 for various processes 122 and HYPA 142. That is, HYPA 142 for GPA 128 of virtual machine 106 may be specific to first hypervisor 104-1. As such, virtual extended page table 144 included within first hypervisor 104-1 may be specific to and/or only applicable in mapping GPA 128 associated with process 122 to HYPA 142 in first hypervisor 104-1.

Additionally, once GVA 124 to GPA 128 to HYPA 142 is mapped for process 122, hyperplexor 140 of virtualization system 100 may perform additional mapping or linking relating to process 122. For example, hyperplexor 140 may utilize a first extended page table 146 included therein to map HYPA 142 from first hypervisor 104-1 to HPA 126 for virtual machine 106. Similar to page table 130 and/or virtual extended page table 144, first extended page table 146 included in hyperplexor 140 may associate, link, or map HYPA 142 for process 122 for first hypervisor 104-1 to HPA 126 included in hyperplexor 140. Additionally, hyperplexor 140 may also include a shadow extended page table 148. Shadow extended page table 148 include in hyperplexor 140 may include a combination mapping from tables included in both hypervisor 104 and hyperplexor 140 for each virtual machine 106 included within virtualization system 100. For example, shadow extended page table 148 may include a combination mapping relating to virtual extended page table 144 included in first hypervisor 104-1, as well as first extended page table 146 in hyperplexor 140. Additionally, and as discussed herein further detail, shadow extended page table 148 may also include a combination mapping relating to a virtual extended page table included in second hypervisor 104-2, as well as a second extended page table in hyperplexor 140. Shadow extended page table 148 may aid in the mapping of GVA 124/GPA 128 after replacing first hypervisor 104-1 with second hypervisor 104-2, as discussed herein.

With continued reference to FIG. 3, the live replacement of first hypervisor 104-1 with second hypervisor 104-2 is discussed below. In the non-limiting example, virtual machine 106 may remain the same and/or unchanged, while second hypervisor 104-2 replaces first hypervisor 104-1. As such associated processes 122, GVA 124 associated with specific process 122, GPA 128, and page table 130 may remain the same during the live replacement or update process from first hypervisor 104-1 to second hypervisor 104-2. However, second hypervisor 104-2 may include distinct components, portions, and/or features than first hypervisor 104-1. For example, second hypervisor 104-2 may include distinct hypervisor physical address (HYPA') 150 and distinct virtual extended page table' 152. HYPA' 150 and virtual extended page table' 152 in second hypervisor 104-2 may be distinct from HYPA 142 and virtual extended page table 144 included in first hypervisor 104-1.

In order for process 122 to be operational and/or function on second hypervisor 104-2, mappings between GPA 128 for virtual machine 106 and HPA 126 of hyperplexor 104, and through second hypervisor 104-2 may be required as similarly discussed herein with respect to first hypervisor 104-1. That is, GPA 128 may be associated with and/or mapped to HYPA' 150 in second hypervisor 104-2. Mapping between GPA 128 and HYPA' 150 within second hypervisor 104-2 may be achieved using virtual extended page table' 152, also included within second hypervisor 104-2. HYPA' 150 and virtual extended page table' 152 may be specific to second hypervisor 104-2, and/or may store and/or include all mappings between GPA 128 for various processes 122 and HYPA' 150. As a result, data found in and/or associated with HYPA' 150 and virtual extended page table' 152 in second hypervisor 104-2 may be distinct from data found in and/or associated with HYPA 142 and virtual extended page table 144 in first hypervisor 104-1.

Hyperplexor 140 may utilize a second extended page table 154 included therein to map HYPA' 150 from second hypervisor 104-2 to HPA 126 for virtual machine 106. As similarly discussed herein, second extended page table 154 included in hyperplexor 140 may associate, link, or map HYPA' 150 for process 122 for second hypervisor 104-2 to HPA 126 included in hyperplexor 140.

However, in the non-limiting example shown in FIG. 3, hyperplexor 140 may also utilize a hyperFresh table 156 to map GPA 128 to HPA 126 via second hypervisor 104-2. HyperFresh table 156 included in hyperplexor 140 may include or store data relating to all GPA 128 to HPA 126 mappings for process 122 for each virtual machine 106 included within virtualization system 100. Each mapping data included or stored within HyperFresh table 156 for each process 122 may be identified, associated with, and/or specific to each virtual machine 106 and/or each hypervisor 104-1, 104-2 for virtualization system 100. The HyperFresh table 156 may include or determine each of these mappings specific to the process 122 within distinct virtual machines 106 by comparing and/or analyzing each of the GPA to HYPA mappings for process 122 for each virtual machine 106 and/or each hypervisor 104-1, 104-2 included in virtualization system 100. For example, HyperFresh table 156 may include a mapping for GPA 124 on virtual machine 106 that includes: GPA 128→HYPA 142→HPA 126. Additionally, HyperFresh table 156 may include another mapping for GPA 128 on second hypervisor 104-1 that includes: GPA 124→HYPA' 150→HPA 126.

As such, and similar to the live migration of containers discussed herein with respect to FIG. 2, live replacement from first hypervisor 104-1 to second hypervisor 104-2 may be achieved at reduced times (e.g., less than 10-ms), and/or may not interrupt or disrupt the interaction a user may have with virtualization system 100 when performing the live replacement or update process. That is, first hypervisor 104-1 may be replaced with second hypervisor 104-2 for virtual machine 106 without disrupting the user's experience (e.g., shutting apps, access down) with virtualization system 100.

FIG. 4 shows a non-limiting example of performing a replacement of an operating system OS 110 within virtualization system 100. Specifically, FIG. 4 depicts a schematic view of a live replacement or update from a first or old OS 110-1 on a first virtual machine 106-1 to a second or new OS 110-2 on a second virtual machine 106-2. In a non-limiting example shown in FIG. 4, and similar to FIG. 2, the replacement of first OS 110-1 with second OS 110-2, as discussed herein, may take place or occur on the same or single physical computing machine 119 (shown in phantom) that may run, operate, and/or engage virtualization system 100, and more specifically first virtual machine 106-1 to second virtual machine 106-2, respectively.

The process or method for replacing between first OS 110-1 to second OS 110-2 in virtualization system 100 may be substantially similar to the processes discussed herein with respect to FIGS. 2 and 3. For example, first virtual machine 106-1 may include a plurality of containers 120, where each container 120 may include process(es) 122 associated therein. A mapping, linking, and/or executed communication between a guest virtual address (GVA) 124 associated with a specific container 120/process 122, and host physical address (HPA) 126 associated with the same process 122 must occur to perform process 122 on first virtual machine 106-1 including first OS 110-1. In the non-limiting example, GVA 124 for process 122 may be associated with and/or mapped to a guest physical address (GPA) 128. Mapping between GVA 124 and GPA 128 within first virtual machine 106-1 may be achieved using page table 130, also included within first virtual machine 106-1. Page table 130 of first virtual machine 106-1 may be specific to first virtual machine 106-1, and/or may store and/or include all mappings between GVA 124 for various processes 122 and GPA 128.

Additionally, once GVA 124 to GPA 128 is mapped for process 122, hypervisor 104 of virtualization system 100 may perform additional mapping or linking relating to process 122. For example, hypervisor 104 may utilize first extended page table 132 included therein to map GPA 128 to HPA 126 for first virtual machine 106-1 including first OS 110-1. Similar to page table 130, first extended page table 132 included in hypervisor 104 may associate, link, or map GPA 128 for process 122 performed in first virtual machine 106-1 to HPA 126 included in hypervisor 104.

With continued reference to FIG. 2, a process for live migration of containers 120 from first virtual machine 106-1 to second virtual machine 106-2, as well as a live replacement or update of first OS 110-1 to second OS 110-2 is discussed below. In the non-limiting example, only containers 120 may be migrated from first virtual machine 106-1 to second virtual machine 106-2. More specifically, containers 120, associated processes 122, and GVA 124 associated with specific processes 122 may be migrated or moved from first virtual machine 106-1 to second virtual machine 106-2 in the live migration process. Additionally, second OS 110-2 included on second virtual machine 106-2 may include a newer/updated version of first OS 110-1 included within first virtual machine 106-1. GVA 124 for process 122 may be associated with and/or mapped to GPA' 134 of second virtual machine 106-2. Mapping between GVA 124 and GPA' 134 within second virtual machine 106-2 may be achieved using page table' 136, also included within second virtual machine 106-2. GPA' 134 and page table' 136 may be specific to second virtual machine 106-2, and/or may store and/or include all mappings between GVA 124 for various processes 122 and GPA' 134. As a result, data found in and/or associated with GPA' 134 and page table' 136 in second virtual machine 106-2 may be distinct from data found in and/or associated with GPA 128 and page table 130 in first virtual machine 106-1.

In the non-limiting example hypervisor 104 may utilize a second extended page table 154 included therein to map GPA' 134 from second virtual machine 106-2 to HPA 126. As similarly discussed herein, second extended page table 154 included in hypervisor 104 may associate, link, or map GPA' 150 for process 122 of second virtual machine 106-2 to HPA 126 included in hypervisor 104. Second extended page table 154 may also be specific to second virtual machine 106-2. As such, and based on the distinction between GPA 128 and GPA'134, data and/or mapping in second extended page table 154 may be distinct from first extended page table 132.

Similar to the non-limiting example shown and discussed herein with respect to FIG. 3, hypervisor 104 shown in FIG. 4 may also utilize hyperFresh table 156 to map GVA 124 to HPA 126 for second virtual machine 106-2. HyperFresh table 156 included in hypervisor 104 may include or store data relating to all GVA 124 to HPA 126 mappings for process 122 for each virtual machine 106-1, 106-2 included within virtualization system 100. Each mapping data included or stored within HyperFresh table 156 for each process 122 may be identified, associated with, and/or specific to each virtual machine 106-1, 106-2. The Hyper-Fresh table 156 may include or determine each of these mappings specific to the process 122 within distinct virtual machines 106 by comparing and/or analyzing each of the GVA to GPA mappings for process 122 for each virtual machine 106-1, 106-2 included in virtualization system 100. For example, HyperFresh table 156 may include a mapping for GVA 124 on first virtual machine 106-1 that includes: GPA 128→GPA 142→HPA 126. Additionally, HyperFresh table 156 may include another mapping for GVA 124 on second virtual machine 106-2 that includes: GPA 124→GPA' 134→HPA 126.

Figure 5:
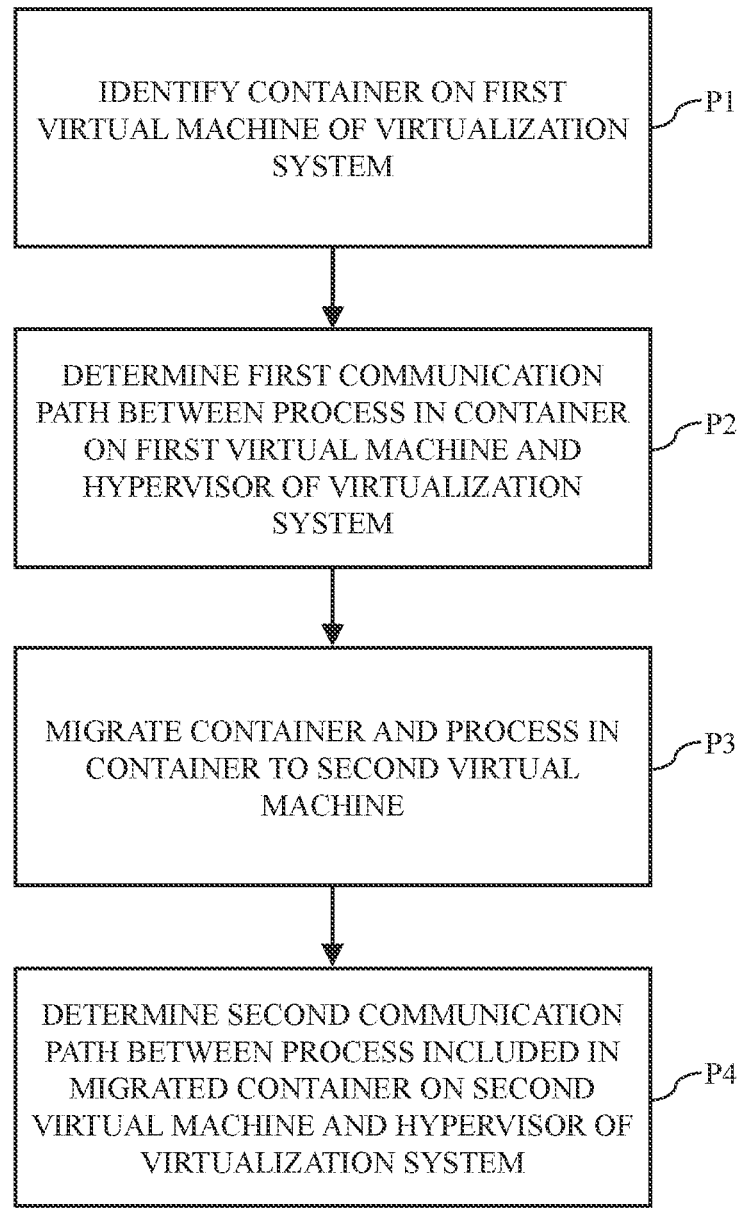
FIG. 5 shows a flowchart illustrating a process for migrating a container in a virtualization system, according to embodiments of the disclosure.

FIG. 5 depicts example processes for migrating a container in a virtualization system. Specifically, FIG. 5 is a flowchart depicting one example process for migrating a container in a virtualization system including a plurality of virtual machines and at least one hypervisor included in a physical computing machine. In some cases, a computing machine may be used to perform the process for migrating a container in a virtualization system, as discussed above with respect to FIG. 2.

In process P1, a container on a first virtual machine of a virtualization system may be identified. More specifically, a container on and/or included/stored within a first virtual machine of a virtualization system may be identified, associated with, and/or related to the first virtual machine. The container may include a process associated with performing a task on a first virtual machine.

In process P2, a first communication path between the process included in the container on the first virtual machine and a hypervisor of the virtualization system may be determined. Determining the first communication path may include identifying a guest virtual address (GVA) associated with the process included in the container, where the GVA may be included within the first virtual machine. Additionally, determining the first communication path may include mapping the GVA associated with the process to a first guest physical address (GPA) associated with the process using a first page table. In a non-limiting example, the first GPA and the first page table may be included within the first virtual machine. Determining the first communication path may also include mapping the first GPA associated with the process to a host physical address (HPA) associated with the process using an extended page table. The HPA and the extended page table may be, for example, included within the hypervisor.

In process P3, the container and the process included in the container may be migrated to a second virtual machine. That is, the container, along with the process included in and/or associated with the identified container (e.g., process P1), may be migrated to the second virtual machine. In a non-limiting example, the second virtual machine may be distinct form the first virtual machine.

In process P4, a second communication path between the process included in the migrated container on the second virtual machine and the hypervisor of the virtualization system may be determined. That is, the second communication path between the process included in the migrated container may be determined, identified, and/or realized. Determining the second communication path in process P4 may further include identifying the GVA associated with the process included in the migrated container. In the non-limiting example, the GVA may be included within the second virtual machine may be identical to the GVA associated with the process included in the container included within the first virtual machine. Additionally, determining the second communication path may also include mapping the GVA associated with the process to a second guest physical address (GPA') associated with the process using a second page table. The second GPA' and the second page table may be included within the second virtual machine, for example. Additionally, the second GPA' included in the second virtual machine may be distinct from the first GPA included in the first virtual machine. Furthermore, the second page table included in the second virtual machine may be distinct from the first page table included in the first virtual machine. Determining the second communication path may further include mapping the second GPA' associated with the process to the HPA associated with the process using the extended page table. Mapping the second GPA' associated with the process to the HPA may further include utilizing an mWarp table included within the hypervisor to aid in the mapping of the second GPA associated with the process to the HPA on the hypervisor. The mWarp table may include predetermined data relating to the mapping of the GVA to the HPA in each of the first virtual machine and the second virtual machine, respectively.

Figure 6:
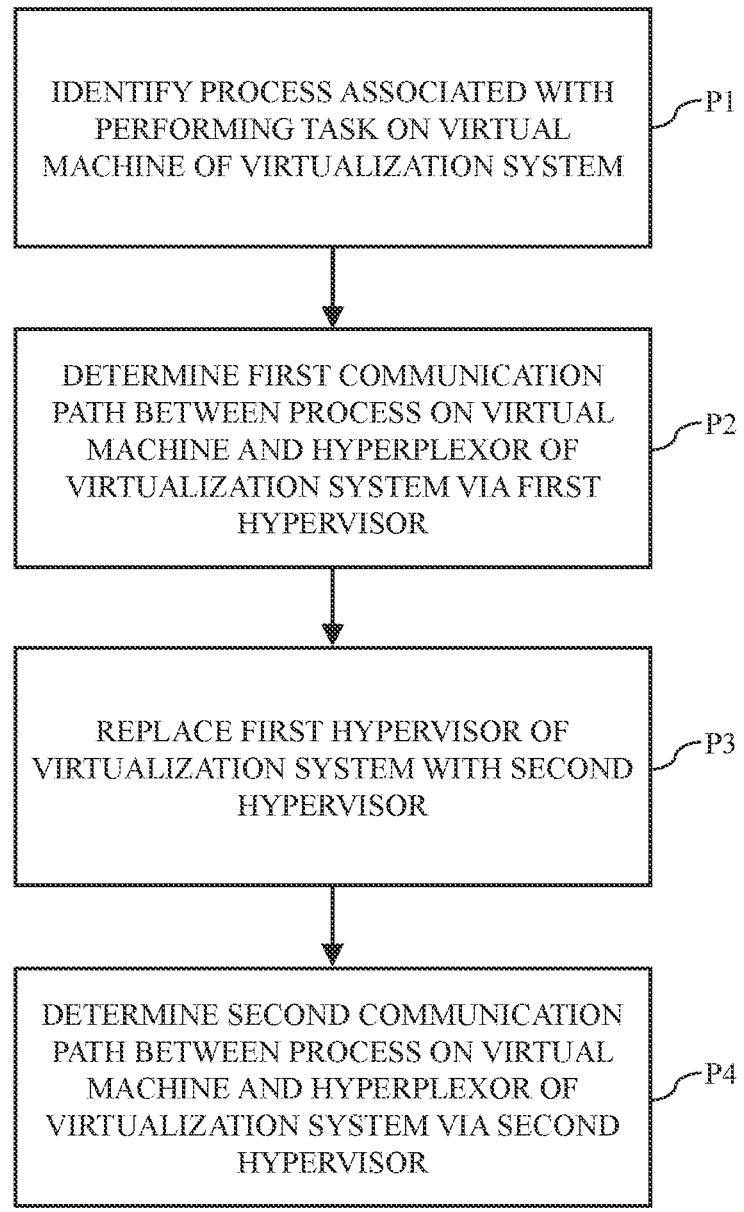
FIG. 6 shows a flowchart illustrating a process for replacing hypervisors in a virtualization system, according to embodiments of the disclosure.

FIG. 6 depicts example processes for replacing hypervisors in a virtualization system. Specifically, FIG. 6 is a flowchart depicting one example process for replacing hypervisors in a virtualization system including a virtual machine, a plurality of hypervisors, and at least one hyperplexor included in a physical computing machine. In some cases, a computing machine may be used to perform the process for migrating a container in a virtualization system, as discussed above with respect to FIG. 3.

In process P1, a process on a virtual machine may be identified. More specifically, a process associated with performing a task on a virtual machine of a virtualization system may be identified.

In process P2, a first communication path between the process included on the virtual machine and a hyperplexor of the virtualization system may be determined. The first communication path between the process included on the virtual machine and the hyperplexor may be formed and/or determined via a first hypervisor of the virtualization system. That is, for example, the first hypervisor may be communicatively connected to the virtual machine and the hyperplexor. Determining the first communication path between the process included on the virtual machine and the hyperplexor of the virtualization system via the first hypervisor may include identifying a guest virtual address (GVA) associated with the process included on the virtual machine, where the GVA may be included within the first virtual machine. Additionally, determining the first communication path may include mapping the GVA associated with the process to a guest physical address (GPA) associated with the process using a page table. In a non-limiting example, the GPA and the page table may be included within the virtual machine. Determining the first communication path may also include mapping the GPA associated with the process to a first hypervisor physical address (HYPA) associated with the process using a first virtual extended page table. In a non-limiting example, the first HYPA and the first virtual extended page table may be included within the first hypervisor. Furthermore, determining the first communication path may include mapping the first HYPA associated with the process to a host physical address (HPA) associated with the process using a first extended page table. The HPA and the first extended page table may, for example, be included within the hyperplexor.

In process P3, the first hypervisor may be replaced. In a non-limiting example, the first hypervisor of the virtualization system may be replaced with a second hypervisor. In the example, the second hypervisor may be communicatively connected to the virtual machine and the hyperplexor, respectively.

In process P4, a second communication path between the process included on the virtual machine and the hyperplexor of the virtualization system may be determined. In a non-limiting example, the second communication path may be determined via a second hypervisor. Determining the second communication path between the process included on the virtual machine and the hyperplexor of the virtualization system via the second hypervisor in process P4 may further include mapping the GPA associated with the process to a second hypervisor physical address (HYPA') associated with the process. Mapping the GPA to the second HYPA' may be achieved using a second virtual extended page table. The second HYPA' and the second virtual extended page table may be included within the second hypervisor. In a non-limiting example, the second virtual extended page table included in the second hypervisor may be distinct from the first virtual extended page table included in the first hypervisor. Moreover, the second HYPA' included in the second hypervisor may be distinct from the first HYPA included in the first hypervisor. Additionally, determining the second communication path may also include mapping the second HYPA' associated with the process to the host physical address (HPA) associated with the process. Mapping the second HYPA' may be achieved using a second extended page table. In the non-limiting example, the HPA and the second extended page table may be included within the hyperplexor. In the example, the second extended page table included in the hyperplexor may be distinct from the first extended page table included in the hyperplexor. Mapping the second HYPA' associated with the process to the HPA may also include utilizing a HyperFresh table included within the hyperplexor to aid in the mapping of the second HYPA' associated with the process to the HPA on the hyperplexor. In a non-limiting example, the HyperFresh table may include predetermined data relating to the mapping of the GPA included in the virtual machine to the HPA in the hyperplexor using each of the first hypervisor and the second hypervisor, respectively.

Figure 7:
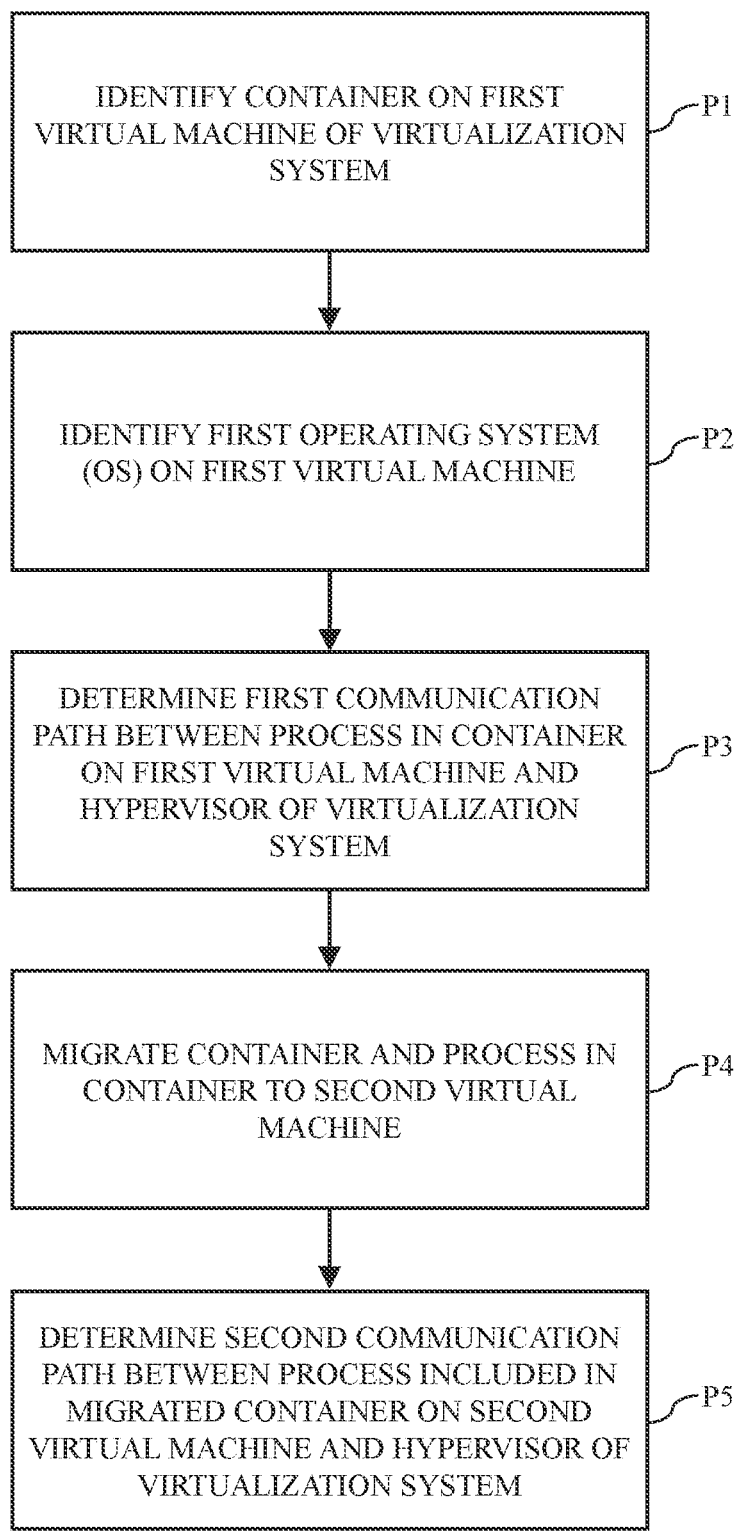
FIG. 7 shows a flowchart illustrating a process for replacing operating systems (OS) in a virtualization system, according to embodiments of the disclosure.

FIG. 7 depicts example processes for replacing operating systems (OS) in a virtualization system. Specifically, FIG. 7 is a flowchart depicting one example process for replacing operating systems (OS) in a virtualization system including a plurality of virtual machines and at least one hypervisor included in a physical computing machine. In some cases, a computing machine may be used to perform the process for migrating a container in a virtualization system, as discussed above with respect to FIG. 4.

In process P1, a container on a first virtual machine of a virtualization system may be identified. More specifically, a container on and/or included/stored within a first virtual machine of a virtualization system may be identified, associated with, and/or related to the first virtual machine. The container may include a process associated with performing a task on the first virtual machine.

In process P2, a first operating system (OS) may be identified. More specifically, a first operating system (OS) included on the first virtual machine may be identified.

In process P3, a first communication path between the process included in the container on the first virtual machine and a hypervisor of the virtualization system may be determined. Determining the first communication path may include identifying a guest virtual address (GVA) associated with the process included in the container, where the GVA may be included within the first virtual machine. Additionally, determining the first communication path may include mapping the GVA associated with the process to a first guest physical address (GPA) associated with the process using a first page table. In a non-limiting example, the first GPA and the first page table may be included within the first virtual machine. Determining the first communication path may also include mapping the first GPA associated with the process to a host physical address (HPA) associated with the process using a first extended page table. The HPA and the first extended page table may be, for example, included within the hypervisor.

In process P4, the container and the process included in the container may be migrated to a second virtual machine. That is, the container, along with the process included in and/or associated the identified container (e.g., process P1), may be migrated to the second virtual machine. In a non-limiting example, the second virtual machine may be distinct form the first virtual machine. Additionally in the non-limiting example, the second virtual machine may include a second operating system (OS) distinct from the first OS on the first virtual machine.

In process P5, a second communication path between the process included in the migrated container on the second virtual machine and the hypervisor of the virtualization system may be determined. That is, the second communication path between the process included in the migrated container may be determined, identified, and/or realized. Determining the second communication path in process P5 may further include identifying the GVA associated with the process included in the migrated container. In the non-limiting example, the GVA may be included within the second virtual machine may be identical to the GVA associated with the process included in the container included within the first virtual machine. Additionally, determining the second communication path may also include mapping the GVA associated with the process to a second guest physical address (GPA') associated with the process using a second page table. The second GPA' and the second page table may be included within the second virtual machine, for example. Additionally, the second GPA' included in the second virtual machine may be distinct from the first GPA included in the first virtual machine. Furthermore, the second page table included in the second virtual machine may be distinct from the first page table included in the first virtual machine. Determining the second communication path may further include mapping the second GPA' associated with the process to the HPA associated with the process using a second extended page table. The second extended page table may, for example, be included within the hypervisor. Additionally, the second extended page table included in the hypervisor may be distinct from the first extended page table included in the hypervisor. Mapping the second GPA' associated with the process to the HPA may further include utilizing a HyperFresh table included within the hypervisor to aid in the mapping of the second GPA' associated with the process to the HPA on the hypervisor. The HyperFresh table may include predetermined data relating to the mapping of the identical GVA may be included in each of the first virtual machine and the second virtual machine, respectively, to the HPA in the hypervisor using (collectively) each of: the first page table in the first virtual machine, the first GPA in the first virtual machine, and the first extended page table in the hypervisor, as well as, the second page table in the second virtual machine, the second GPA' in the second virtual machine, and the second extended page table in the hypervisor.

Although shown as being performed sequentially or in an ordered number of steps, it is understood that some processes/steps shown in FIGS. 5-7 may be performed concurrently, and/or in a different order. For example, and with reference to FIG. 7, processes P1 and P2 may be performed concurrently. Alternatively, processes P2 may be performed before process P1.

Additional information relating to the processes and methods discussed herein may also be found in: (1) "mWarp: Accelerating Intra-Host Live Container Migration via Memory Warping," Sinha et al., IEEE, April 2019 (https://ieeexplore.ieee.org/documnets/8845167), and (2) "Fast and Live Hypervisor Replacement," Doddamani et al., VEE 2019: Proceedings of the 15th ACM SIGPLAN/SIGOPS International Conference on Virtual Execution Environments, April 2019 (https://dl.acm.org/doi/10.1145/3313808.3313821). Both references identified above are incorporated herein by reference.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As discussed herein, various systems and components are described as "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed:

1. A method for migrating a container in a virtualization system, the method comprising:
    identifying the container on a first virtual machine of the virtualization system, the container including a process associated with performing a task on the first virtual machine;

determining a first communication path between the process included in the container on the first virtual machine and a hypervisor of the virtualization system by;
   identifying a guest virtual address (GVA) associated with the process included in the container, the GVA included within the first virtual machine;
   mapping the GVA associated with the process to a first guest physical address (GPA) associated with the process using a first page table, the first GPA and the first page table included within the first virtual machine; and
   mapping the first GPA associated with the process to a host physical address (HPA) associated with the process using an extended page table, the HPA and the extended page table included within the hypervisor;
migrating the container and the process included in the container to a second virtual machine, the second virtual machine distinct form the first virtual machine; and
determining a second communication path between the process included in the migrated container on the second virtual machine and the hypervisor of the virtualization system.

2. The method of claim 1, wherein the first virtual machine and second virtual machine are located on the same physical computing machine.

3. The method of claim 1, wherein determining the second communication path between the process included in the migrated container on the second virtual machine and the hypervisor of the virtualization system further includes:
   identifying the GVA associated with the process included in the migrated container, the GVA included within the second virtual machine being identical to the GVA associated with the process included in the container included within the first virtual machine;
   mapping the GVA associated with the process to a second guest physical address (GPA') associated with the process using a second page table, the second GPA' and the second page table included within the second virtual machine; and
   mapping the second GPA' associated with the process to the HPA associated with the process using the extended page table.

4. The method of claim 3, wherein mapping the second GPA' associated with the process to the HP A further includes:
   utilizing an mWarp table included within the hypervisor to aid in the mapping of the second GPA associated with the process to the HPA on the hypervisor, the mWarp table including predetermined data relating to the mapping of the GVA to the HPA in each of the first virtual machine and the second virtual machine, respectively.

5. The method of claim 3, wherein the second GPA' included in the second virtual machine is distinct from the first GPA included in the first virtual machine.

6. The method of claim 3, wherein the second page table included in the second virtual machine is distinct from the first page table included in the first virtual machine.

7. A method for replacing hypervisors in a virtualization system, the method comprising:
   identifying a process associated with performing a task on a virtual machine of the virtualization system;
   determining a first communication path between the process included on the virtual machine and a hyperplexor of the virtualization system via a first hypervisor, the first hypervisor communicatively connected to the virtual machine and the hyperplexor, the determining by;
      identifying a guest virtual address (GVA) associated with the process included on the virtual machine, the GVA included within the virtual machine;
      mapping the GVA associated with the process to a guest physical address (GPA) associated with the process using a page table, the GPA and the page table included within the virtual machine;
      mapping the GPA associated with the process to a first hypervisor physical address (HYPA) associated with the process using a first virtual extended page table, the first HYPA and the first virtual extended page table included within the first hypervisor; and
      mapping the first HYPA associated with the process to a host physical address (HPA) associated with the process using a first extended page table, the HPA and the first extended page table included within the hyperplexor;
   replacing the first hypervisor of the virtualization system with a second hypervisor, the second hypervisor communicatively connected to the virtual machine and the hyperplexor; and
   determining a second communication path between the process included on the virtual machine and the hyperplexor of the virtualization system via the second hypervisor.

8. The method of claim 7, wherein the first virtual machine and second virtual machine are located on the same physical computing machine.

9. The method of claim 1, wherein determining the second communication path between the process included on the virtual machine and the hyperplexor of the virtualization system via the second hypervisor further includes:
   mapping the GPA associated with the process to a second hypervisor physical address (HYPA') associated with the process using a second virtual extended page table, the second HYPA' and the second virtual extended page table included within the second hypervisor; and
   mapping the second HYPA' associated with the process to the host physical address (HPA) associated with the process using a second extended page table, the HPA and the second extended page table included within the hyperplexor.

10. The method of claim 9, wherein mapping the second HYPA' associated with the process to the HPA further includes:
   utilizing a HyperFresh table included within the hyperplexor to aid in the mapping of the second HYPA' associated with the process to the HPA on the hyperplexor, the HyperFresh table including predetermined data relating to the mapping of the GPA included in the virtual machine to the HPA in the hyperplexor using each of the first hypervisor and the second hypervisor, respectively.

11. The method of claim 9, wherein the second virtual extended page table included in the second hypervisor is distinct from the first virtual extended page table included in the first hypervisor.

12. The method of claim 9, wherein the second HYPA' included in the second hypervisor is distinct from the first HYPA included in the first hypervisor.

13. The method of claim 9, wherein the second extended page table included in the hyperplexor is distinct from the first extended page table included in the hyperplexor.

14. A method for replacing operating systems (OS) in a virtualization system, the method comprising:
identifying:
a container on a first virtual machine of the virtualization system, the container including a process associated with performing a task on first virtual machine, and
a first operating system (OS) included on the first virtual machine;
determining a first communication path between the process included in the container on the first virtual machine and a hypervisor of the virtualization system by:
identifying a guest virtual address (GVA) associated with the process included in the container, the GVA included within the first virtual machine;
mapping the GVA associated with the process to a first guest physical address (GPA) associated with the process using a first page table, the first GPA and the first page table included within the first virtual machine; and
mapping the first GPA associated with the process to a host physical address (HPA) associated with the process using a first extended page table, the HPA and the first extended page table included within the hypervisor;
migrating the container and the process included in the container to a second virtual machine, the second virtual machine distinct form the first virtual machine, and
wherein the second virtual machine includes a second operating system (OS) distinct from the first OS on the first virtual machine; and
determining a second communication path between the process included in the migrated container on the second virtual machine and the hypervisor of the virtualization system.

15. The method of claim 14, wherein the first virtual machine and second virtual machine are located on the same physical computing machine.

16. The method of claim 14, wherein determining the second communication path between the process included in the migrated container on the second virtual machine and the hypervisor of the virtualization system further includes:
identifying the GVA associated with the process included in the migrated container, the GVA included within the second virtual machine being identical to the GVA associated with the process included in the container included within the first virtual machine;
mapping the GVA associated with the process to a second guest physical address (GPA') associated with the process using a second page table, the second GPA' and the second page table included within the second virtual machine; and
mapping the second GPA' associated with the process to the HPA associated with the process using a second extended page table, the second extended page table included within the hypervisor.

17. The method of claim 16, wherein mapping the second GPA' associated with the process to the HPA further includes:
utilizing a HyperFresh table included within the hypervisor to aid in the mapping of the second GPA' associated with the process to the HPA on the hypervisor, the HyperFresh table including predetermined data relating to the mapping of the identical GVA included in each of the first virtual machine and the second virtual machine, respectively, to the HPA in the hypervisor using collectively each of:
the first page table in the first virtual machine, the first GPA in the first virtual machine, and the first extended page table in the hypervisor; and
the second page table in the second virtual machine, the second GPA' in the second virtual machine, and the second extended page table in the hypervisor.

18. The method of claim 16, wherein the second page table included in the second virtual machine is distinct from the first page table included in the first virtual machine.

19. The method of claim 16, wherein the second GPA' included in the second virtual machine is distinct from the first GPA included in the first virtual machine.

20. The method of claim 16, wherein the second extended page table included in the hypervisor is distinct from the first extended page table included in the hypervisor.

* * * * *